United States Patent [19]

Kobayashi et al.

[11] Patent Number: 4,718,091
[45] Date of Patent: Jan. 5, 1988

[54] MULTIFUNCTIONAL IMAGE PROCESSOR

[75] Inventors: Yoshiki Kobayashi; Tadashi Fukushima; Yoshiyuki Okuyama; Kotaro Hirasawa; Takeshi Katoh; Yutaka Kubo, all of Hitachi, Japan

[73] Assignee: Hitachi, Ltd., Tokyo, Japan

[21] Appl. No.: 692,108

[22] Filed: Jan. 17, 1985

[30] Foreign Application Priority Data

Jan. 19, 1984 [JP] Japan .................................. 59-6308

[51] Int. Cl.⁴ .............................................. G06K 9/36
[52] U.S. Cl. ........................................ 382/41; 382/49; 382/54
[58] Field of Search ................. 358/27, 282; 382/41, 382/49, 50, 54, 56; 364/133

[56] References Cited

U.S. PATENT DOCUMENTS

| | | | |
|---|---|---|---|
| 4,266,249 | 5/1981 | Chai et al. | 358/260 |
| 4,319,267 | 3/1982 | Mitsuya et al. | 358/260 |
| 4,322,716 | 3/1982 | Sternberg | 382/49 |
| 4,464,788 | 8/1984 | Stenberg et al. | 382/49 |
| 4,550,437 | 10/1985 | Kobayashi et al. | 358/166 |

OTHER PUBLICATIONS

*Electronic Design*, pp. 209–215, Oct. 4, 1984.
*Computer Design*, vol. 18, No. 9, 9/79, pp. 93–101; Andrews, H. C.: "Semiconductor Advances Boost Digital Image Processing System Performance".
*PRIP 82-Proceedings of the IEEE Comp. Soc. Conf. on Pat. Rec. & Img. Procg.*, 6/14–17/82, pp. 390–392; Orbach, Z.: "Real-Time Video Image Enh. Using Hard. Conv.".
*Proc. of the IEEE*, vol. 67, No. 5, 5/79, pp. 826–856, Preston, K., Jr.: Basics of Cellular Logic with Some Appl. in Medical Image Procc.".

*Primary Examiner*—Leo H. Boudreau
*Assistant Examiner*—Jose L. Couso
*Attorney, Agent, or Firm*—Antonelli, Terry & Wands

[57] ABSTRACT

A multifunctional image processor capable of executing a variety of image processing functions such as a spatial convolution and a color image processing at a higher speed includes an image data distribute unit for distributing the gray-scale and color image data externally supplied by use of programs in accordance with the operation of the image processing and a parallel image data processing unit for conducting a parallel operation on distributed image data in accordance with the operation of the image processing.

6 Claims, 8 Drawing Figures

MULTIFUNCTIONAL IMAGE PROCESSOR

The present invention relates to an image processor of an image processing system, and in particular, to a multifunctional image processor suitable for executing various image processing functions at a higher speed.

Image processing techniques, in general, are classified into such processing steps as preprocessing, feature extraction, and object recognition processing. For preprocessing, there has been a system utilizing a general-purpose computer for selecting and executing various kinds of preprocessing to be applicable to general purposes and to be repeated in many cases by use of programs for the respective objects. However, preprocessing cannot be achieved at a satisfactory speed by a series of operations: Fetching image data, executing a necessary arithmetic operation on the fetched image data, and storing the result of the operation again in a memory.

In the field of image processing (preprocessing), on the other hand, there are a lot of arithmetic operations to be executed on image data items existing close to each other, for example, in a special convolution for implementing noise reduction and contour extract functions, that is, a parallel processing is required to be executed on local data items in many cases.

Although such operations suitable for the parallel processing can be rapidly executed by use of a hardware system dedicated to the parallel processing, such system possesses only the dedicated function, hence it has been impossible to process various functions by a single processor at a high speed required for the above-stated processing.

It is therefore an object of the present invention to provide a multifunctional image processor which is capable of executing various image processing (preprocessing) operations in realtime or at a higher speed.

In accordance with the present invention, various kinds of image processing functions can be performed at a higher speed by disposing image data distribute means capable of distributing color image data externally supplied with gray-scale information by use of programs in association with operations of image processing and parallel image data processing means for executing parallel operations on the distributed data in accordance with operations of image processing.

The objects and features of the present invention will become more apparent from the consideration of the following detailed description taken in conjunction with the accompanying drawings in which.

Figure 1:
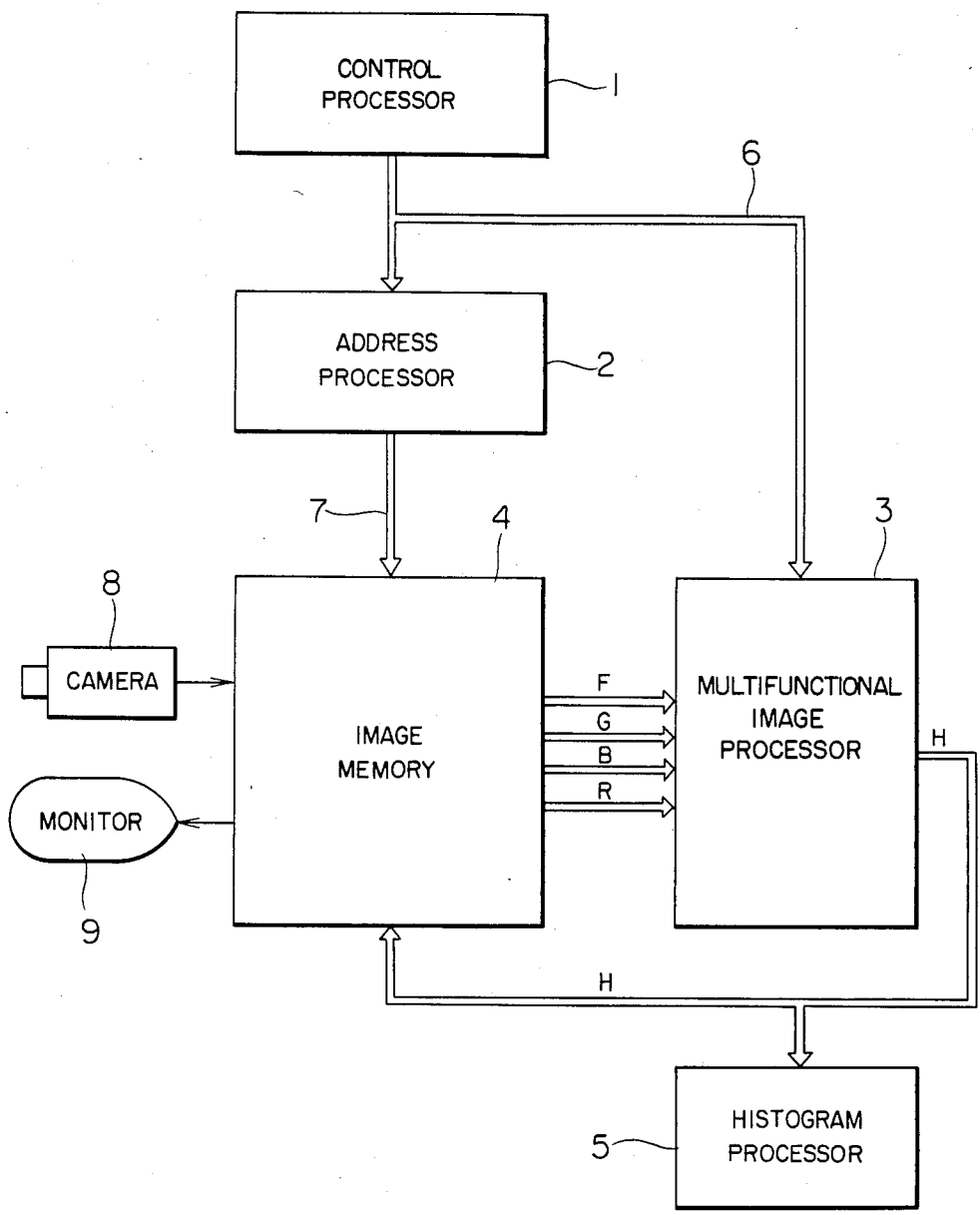
FIG. 1 is a schematic block diagram illustrating a system configuration example utilizing a multifunctional image processor of the present invention.

In the following paragraphs, the present invention will be described in conjunction with embodiments thereof. Referring to FIG. 1, a control processor 1 for controlling the overall system comprises a general-purpose microprocessor and supplies various instructions through a system bus 6 to an address processor 2 and a multifunctional image processor 3 of the present invention, thereby achieving various image processing. These instructions are determined depending on programs in the control processor 1, hence the image processing in this system can be regarded as programmable in this regard. The address processor 2 for executing an access control on an image memory 4 fetches an image to be processed via an address bus 7 and carries out an addressing operation for storing an image resulting from the image processing based on the instructions. The image memory 4 is connected to an image monitor 9 for displaying image data and an industrial mono-chrome and/or color television camera 8 for shooting an object to obtain an image thereof in this embodiment. The image data supplied from the image memory 4 to the multifunctional image processor 3 primarily comprises mono-chrome image data F, and color image data G (green), B (blue), and R (red). The image memory 4 is constructed with a maximum of four planes (to be referred to as channels hereinbelow) of image memory units (assigned with channel numbers 0 to 3) in which the mono-chrome image data F is stored in the image memory unit associated with channel number 0 and the color image data G, B, and R is stored in the image memory units associated with channel numbers 1, 2, and 3, respectively. The image memory 4 supplies the multifunctional image processor 3 with the image data to be processed including the mono-chrome image data F and color image data G, B, and R.

On the other hand, image data H obtained as a result of processing conducted by the multifunctional image processor 3 is outputted to the image memory 4 and can be stored in an image memory unit associated with an arbitrary channel number (0 to 3) under control of the address processor 2. At the same time, a gray-scale density frequency distribution of the output image data H, an X/Y projection distribution, and the like are obtained by use of a histogram processor 5. The data on each channel of the image memory 4, that is, the image data F, G, B, R, and H, is each comprised of 8-bit gray-scale data and 1-bit binary data.

Figure 2:
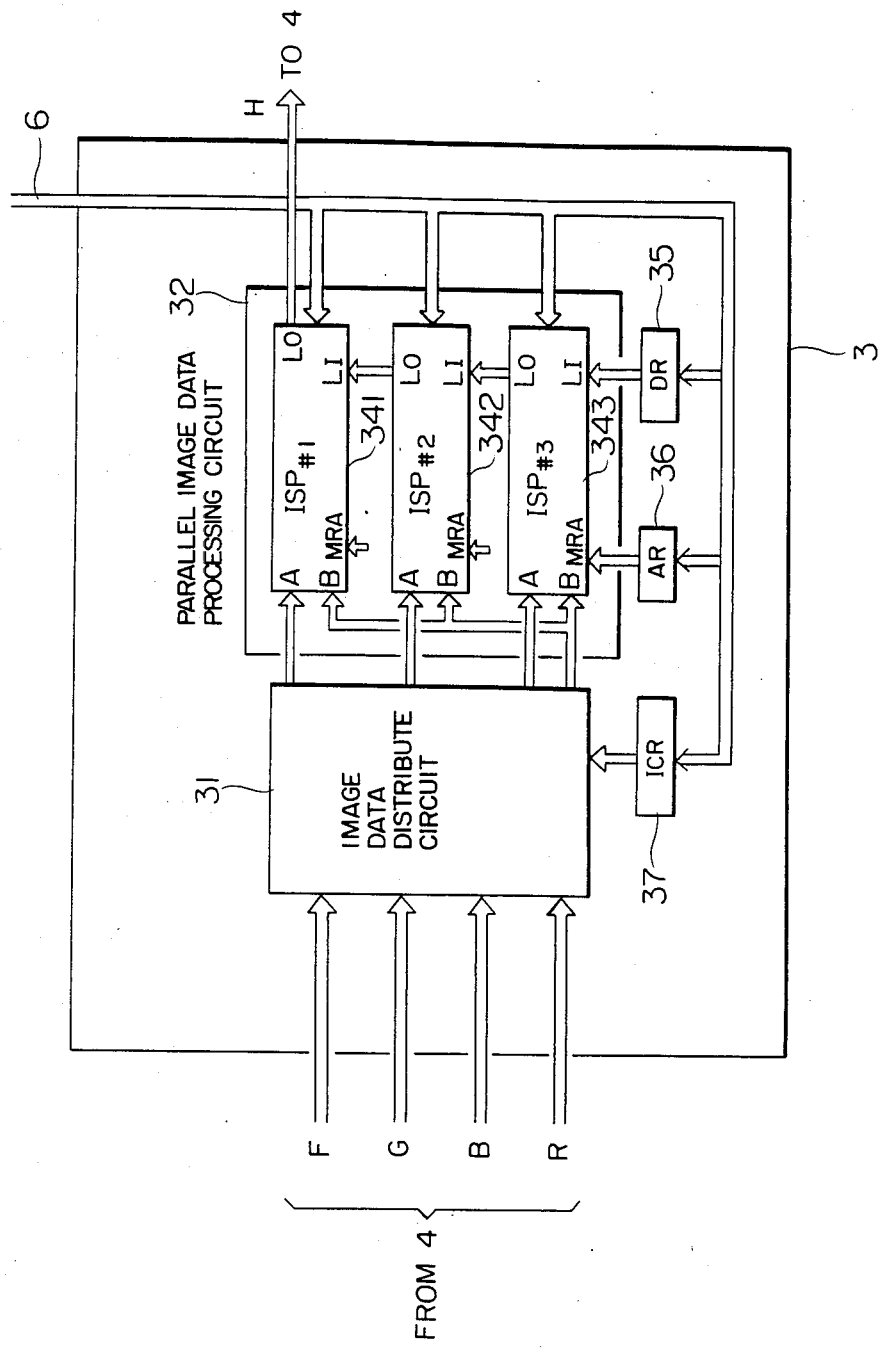
FIG. 2 is a circuit block diagram illustrating an embodiment of a multifunctional image processor of the present invention.

In FIG. 2, the multifunctional image processor 3 receives image data F, G, B, R inputted from the image memory 4 depicted in FIG. 1, performs various kinds of image processing, and outputs the image data H. This image processor 3 comprises an image data distribute circuit 31 and a parallel image data processing circuit 32. The image data distribute circuit 31 receives image data F, G, B, and R and distributes to the parallel image data processing circuit 32 at the subsequent stage image data in a form corresponding to an instruction set to an instruction register 37 of an input image by the control processor 1. The parallel image data processing circuit 32 comprises three image signal processors (ISP) each configured in a large scale integration circuit and connected in the circuit 32. The respective ISP's 341-343 process data inputted from the image input ports A, B, and LI, respectively and delivers a result of the processing to an output port LO. Data from a data register (DR) 35 is fed to port LI of the ISP 343 at the first stage and image data H comprising 8-bit gray-scale data and 1-bit binary data is outputted as final result from the port LO of ISP 341 at the last stage. Part of the operations of the processing in the ISP's 341–343 and input image data are determined by setting data such as a weighting coefficient from the control processor 1 into an address data register (AR) 36, by loading data in the data register (DR) 35, and by supplying a control signal FUN of an operation function to each ISP through system bus 6.

Figure 3:
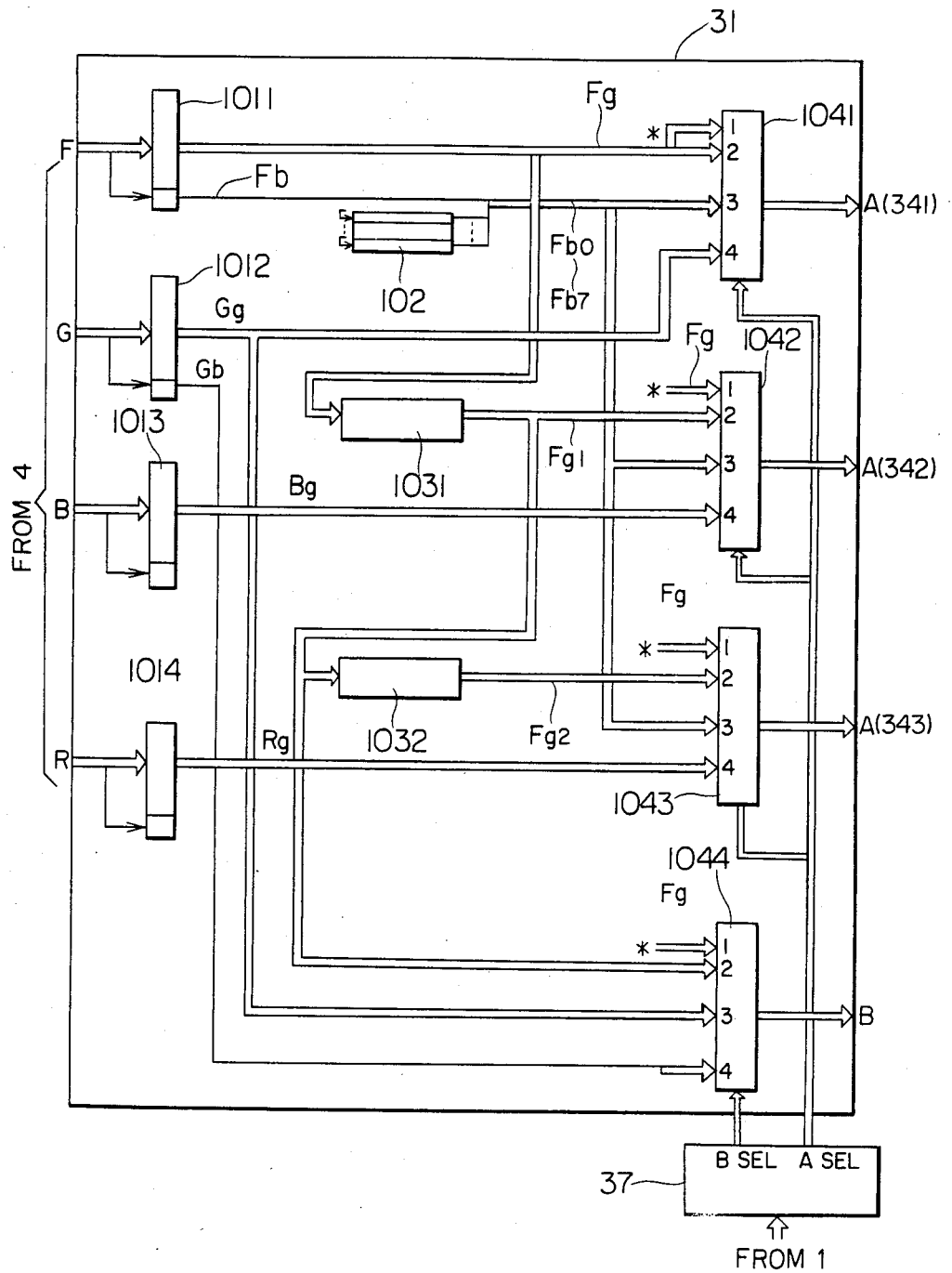
FIG. 3 depicts an example of an image data distribute circuit.

Referring to FIG. 3, the registers 1011–1014 for latching the image data F, G, B, and R inputted to the image data distribute circuit 31 are respectively so configured that the 8-bit gray-scale data and the 1-bit binary data can be separately fetched. Assume here that monochrome image data F includes gray-scale data $F_g$ and binary data $F_b$ and that the color image data G, B, and R contain the gray-scale data $G_g$, $B_g$, and $R_g$, and the binary data $G_b$, $B_b$, and $R_b$, of color information, green, blue and red, respectively. A delay circuit 102 processes the one-bit binary data $F_b$ of the monochrome image data F and outputs seven data signals obtained by delaying the one-bit binary data $F_b$ by one line to seven lines in terms of lines on the screen. The binary data $F_b$ and delayed signals are represented to be $F_{b0}$ to $F_{b7}$, respectively. Delay circuits 1031 and 1032 are serially connected and each supplies a delay to a gray-scale data $F_g$ of the mono-chrome image data F by the one-line step, so the outputs therefrom are delayed by one line and two lines, respectively and are represented as $FG_1$ and $FG_2$, respectively. Selectors 1041–1044 each is disposed to select one of four inputs so as to determine inputs to ports A and B of the ISP's 341–343 of the parallel image data processing circuit 32. In these selectors 1041–1043, the inputs assigned with the same input number are selected in accordance with a port select signal ASEL(n) loaded in an instruction register 37, then the selected signal is transmitted to the port A of each ISP 341–343 in the parallel image data processing circuit 32. A selector 1044 performs a signal selection in accordance with a port B select signal BSEL(n) set into the instruction register 37 and the selected data is sent to the port B of each ISP 341–343. In this embodiment, however, the value n ranges from one to four and the inputs whose input numbers match those assigned to the selectors 1041–1044, respectively of FIG. 3 are selected. (Refer to Table 1 for details about the select operation.)

TABLE 1

| A SEL (n) | | B SEL (n) | |
|---|---|---|---|
| n | Input to each port A | n | Input to port B of all ISP's |
| 1 | $F_g$ for all ISP's | 1 | $F_g$ |
| 2 | ISP 341 ← $F_g$<br>ISP 342 ← $F_{g1}$<br>ISP 343 ← $F_{g2}$ | 2 | $F_{g1}$ |
| 3 | $F_{b0}$ $F_{b7}$ for all ISP's | | $G_g$ |
| 4 | ISP 341 ← $G_g$<br>ISP 342 ← $B_g$<br>ISP 343 ← $R_g$ | 4 | Data obtained by expanding $G_b$ to eight bits |

In accordance with the above-stated configuration, the image data associated with the operation of the image processing can be inputted to each ISP by use of programs by appropriately setting ASEL(n) and BSEL(n) in accordance with instructions from the control processor 1.

Figure 4:
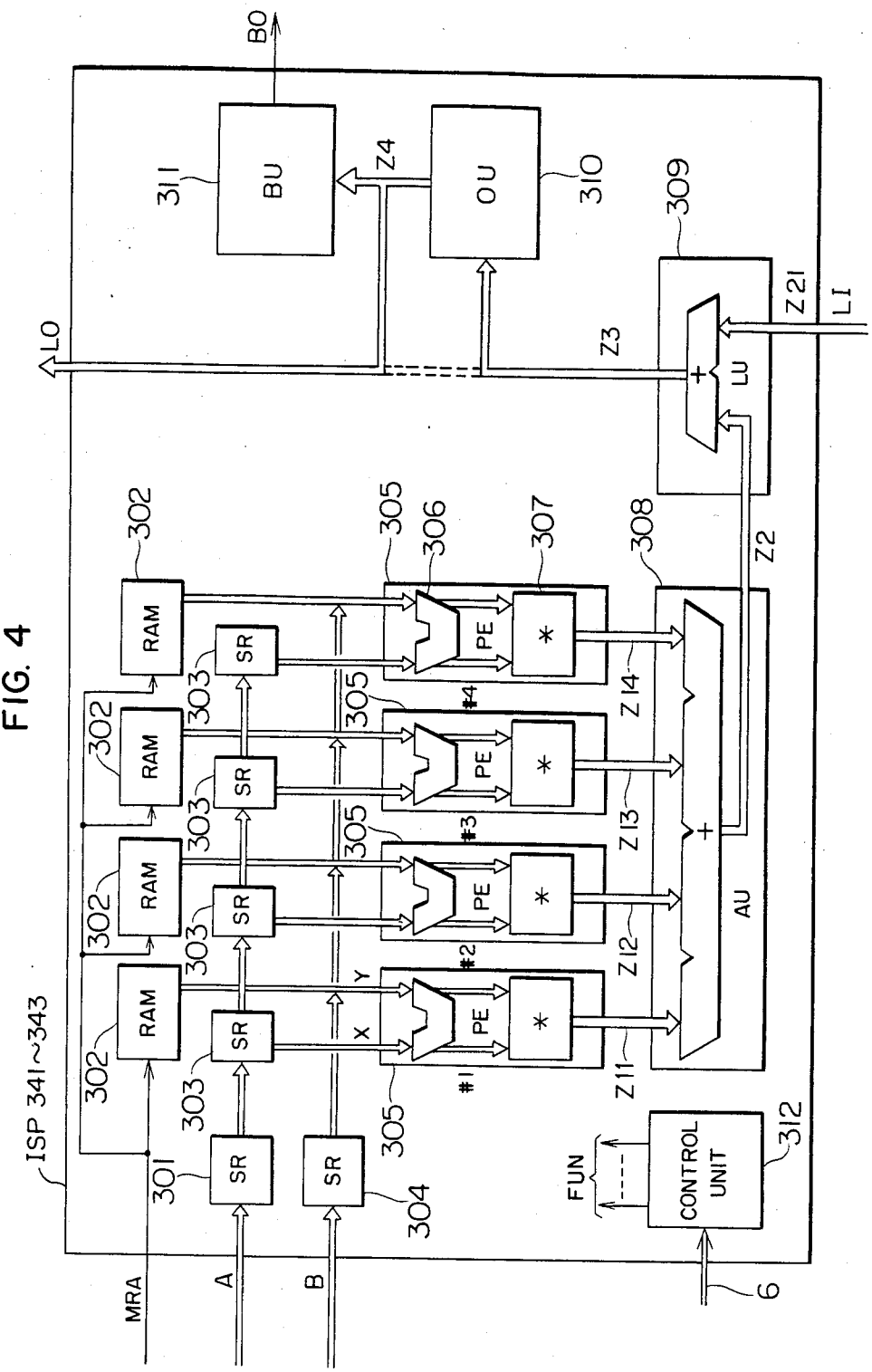
FIG. 4 illustrates a configuration example of a parallel image data processing circuit.

Each ISP 341–343 of FIG. 2 has basically the same configuration, an example of which is depicted in FIG. 4. The ISP is an LSI circuit for image processing and this processing circuit has been disclosed in the Japanese Patent Laid-Open No. 59-146,366 (U.S. patent application Ser. No. 578,508) and comprises the following units. Although the configuration of the system is changed as compared with that disclosed in the above-mentioned patent application for the convenience in the following description, they are fundamentally the same.

(1) Four 16-word RAM's 302 (8 bits/word) for storing the weighting coefficients received via AR 36 at the MRA port for the operations such as the spatial convolution and color image processing to be described later;

(2) Variable-stage shift registers 301 and 304 for delaying images inputted from ports A and B, respectively, by the specified number of stages;

(3) Four shift registers 303 for delaying the output from the variable-stage shift register 301 associated with port A by the one-pixel step and for outputting the resultant data as the input data to a processor element 305;

(4) Four processor elements (PE's) 305 each comprising two arithmetic units 306 (add and subtract) and 307 (multiply) and to which the image data from port A is inputted as an input X thereof and the image data from the RAM 302 or port B is selectively inputted as the other input Y thereof; these two arithmetic units 306, 307 cooperate to carry out convolution and Min, Max operations as shown in Column PEFUN (n) of Table 2;

(5) An arithmetic unit (AU) 308 for inputting outputs Z11 to Z14 from the PE's 305; the AU 308 carries out addition of inputs and Min, Max operations as shown in Column AFUN (n) of Table 2;

(6) A linkage unit (LU) 309 for inputting an output Z2 from the AU 308 and image data Z21 from a port LI; the LU 309 carries out addition of inputs and Min, Max operations;

(7) An output unit (OU) 310 provided only in ISP 341 for inputting an output Z3 from the LU 309; the OU 310 includes an absolute-value circuit and a selector to produce a shifted output for scaling and an absolute-value output;

(8) A binary conversion unit (BU) 311 provided only in ISP 341 for inputting an output Z4 from the OU 310;

(9) An internal control unit for receiving a signal FUN specifying an ISP operation through a bus 6 from the control processor 1 and for specifying the operation of each unit and input signal selection The concrete data of the signal FUN is listed in Table 2. That is, the signal FUN comprises eight signals as represented in the table in which IFUN is a signal for selecting the Y input of the PE 305; ADLY and BDLY are signals for specifying the number of delay stages of the variable-stage shift registers 301 and 304, respectively, PEFUN and PEINH are signals for specifying an operation of the PE 305, and AUFUN, LUFUN, and OUFUN are signals for specifying operations of the AU 308, LU 309, and OU 310, respectively. The FUN signals are connected to respective units, as indicated in the following Table 2, although the connections are omitted in FIG. 4.

TABLE 2

| FUN | Meaning |
|---|---|
| Input function of PE IFUN (n) | 1 - Operation between port A as X input and RAM as Y input<br>2 - Operation between ports A as X input and B as Y input |
| Number of delay stages for port A ADLY (n) | N - Delay the data inputted from port A by N stages. |
| Number of delay stages for port B BDLY (n) | N - Delay the data inputted from port B by N stages. |
| PE function PEFUN (n) | 1 - X • Y     11 - X EOR Y<br>2 - X     12 - X ENOR Y<br>3 - X + Y     13 - X ENOR Y and bit count<br>4 - \|X + Y\|     14 - $X^2$<br>5 - X - Y<br>6 - \|X - Y\|     15 - $(X - Y)^2$<br>7 - Max (X, Y)     16 - $(X + Y)^2$<br>8 - Min (X, Y)<br>9 - X AND Y<br>10 - X OR Y |
| AU function AUFUN (n) | 1 - $\sum_i Z_{li}$<br><br>2 - $\max_i Z_{li}$<br><br>3 - $\min_i Z_{li}$ |
| LU function LUFUN (n) | 1 - Z2 + Z21<br>2 - Max (Z2, Z21)<br>3 - Min (Z2, Z21)<br>4 - Z2 |
| OU function OUFUN (n, N) | 1, N - Conduct N-bit shift down on Z3.<br>2, N - Obtain the absolute value of Z3 and conduct N-bit shift down on Z3.<br>3, N - Output Z3. |
| PE inhibit PEINH (a, b, c, d) | (a, b, c, d) - Set PE#1, #2, #3, and #4 to the states a, b, c, and d.<br>1 - Output the operation result.<br>2 - Output "0".<br>3 - Output the minimum value.<br>4 - Output the maximum value. |

A variety of image processing operations can be executed by supplying the above-stated image data distribute circuit 31 and the parallel image data processing circuit 32 with appropriate control signals and data by use of programs of the control processor 1.

Next, an example of various image processing operations conducted by use of the multifunctional image processor will be described. It is noted that OU 310 and BU 311 are not provided in ISPs 342 and 343 since they are not needed in those units, and in those units the output Z3 of LU 309 is applied directly as output LO.

Figure 5:
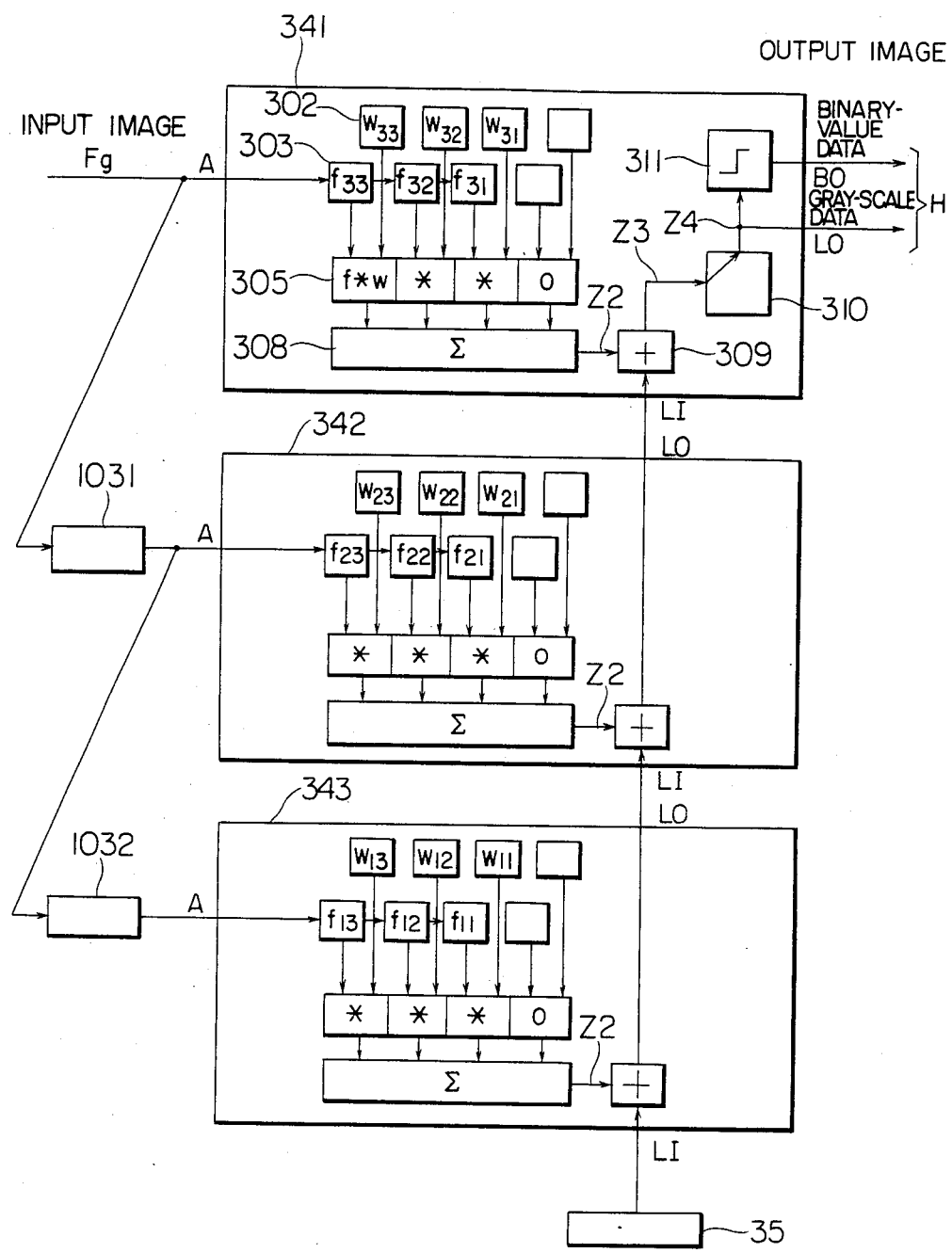
FIG. 5 is a schematic diagram for explaining an example of image processing in which the spatial convolution is executed.

FIG. 5 illustrates the first example in which spatial convolution is carried out. The gray-scale data Fg of the mono-chrome image data F is used for this operation. Assume that ASEL (2) is specified as the port A select signal in the instruction register 37 for the selectors 1041-1043 of the image data distribute circuit 31 and that ADLY (0) specifies the number of the delay stages associated with port A for the ISP's 341-343 of the parallel image data processing circuit 32. In this case, Fg, Fg1, and Fg2 are obtained as the port A inputs to the ISP's 341-343 from Table 1. Assume now that an array of the gray-scale data Fg of the mono-chrome image data on the screen is configured with L (rows) by M (columns) pixels as depicted in Table 3.

TABLE 3

| line 1 | $f_{11}, f_{12}, \ldots, f_{1M}$ |
|---|---|
| line 2 | $f_{21}, f_{22}, \ldots, f_{2M}$ |
| ⋮ | ⋮ |
| line L | $f_{L1}, f_{L2}, \ldots, f_{LM}$ |

For the gray-scale data Fg of the mono-chrome image data, it is assumed that the data elements $f_{11}, f_{12}, \ldots, f_{1M}$ of line 1 are first inputted in this order and the elements $f_{21}, f_{22}, \ldots, f_{2M}$ of line 2 are next inputted in this sequence. Each pixel data $f_{LM}$ comprises eight bits as described before.

The shift register 303 in the ISP transfers the data to the right with a 1-pixel delay. As for the column, a 1-line delay (a M-pixel delay in the example of Table 3) is provided by delay circuits 1031 and 1032 in the image data distribute circuit 31, hence at a point where $f_{11}$, $f_{12}$, and $f_{13}$ are set to the shift register 303 of the ISP 343 via port A as illustrated in FIG. 5, $f_{21}$, $f_{22}$, and $f_{23}$ inputted with a one-line delay thereafter are set to the shift register 303 of the ISP 342, and $f_{31}$, $f_{32}$, and $f_{33}$ which are further one line delayed as compared with $f_{21}$, $f_{22}$, and $f_{23}$ are set to the shift register 303 of the ISP 341. On the other hand, the spatial convolution weighting parameters wij (i, j=1 to 3) are loaded in the RAM 302 via port MRA as depicted in FIG. 4.

Next, assume that the following conditions are specified for each ISP. That is, the input function which is the Y input select signal of the PE 305 is IFUN (1), the PE function which is the signal for specifying the operation of the PE 305 is PEFUN (1), and the PE inhibit is indicated by PEINH (1, 1, 1, 2). Referring to Table 2, the contents of the RAM described above and the content of the register 303 obtained from port A are inputted to three PE's 305 disposed on the left, and the products therebetween are outputted as $Z_{11}$ to $Z_{13}$. Consequently, the port B input does not affect the circuit operation in this situation, that is, the port B select signal BSEL (n) and BDLY (n) which specifies the number of delay stages for port B need not be specified; furthermore, the output from the right-most PE is forcibly set to zero, hence the RAM 302 and register 303 associated with the PE do not affect the circuit operation, either. Assume now AUFUN (1) is specified to each ISP as a signal for indicating an operation of the arithmetic unit (AU) function, then the AU 308 calculates the sum of products of each PE 305 described-above as follows:

$$Z2 \text{ of } ISP\ 341 = \sum_{j=1}^{3} f_{3j}w_{3j}$$
$$Z2 \text{ of } ISP\ 342 = \sum_{j=1}^{3} f_{2j}w_{2j} \quad (1)$$
$$Z2 \text{ of } ISP\ 343 = \sum_{j=1}^{3} f_{1j}w_{1j}$$

Assume that LUFUN (1) is specified for each ISP as a signal for indicating an operation of the linkage unit (LU) function, that OUFUN (3, N) is specified for the ISP's 342 and 343 as signals for indicating an operation of the output unit (OU) function, and that OUFUN (1, N) is specified for the ISP 341. Since each ISP adds an input Z21 from port L1 and each Z2 obtained from expression (1), if the data register 35 is beforehand set to zero, the output Z3 from the LU 309 of the ISP 341 is represented as the sum of each Z2 of expression (1). (Refer to expression (2) for details.)

$$Z3 = \sum_{i=1}^{3} \sum_{j=1}^{3} f_{ij} w_{ij} \qquad (2)$$

As a result, the ISP 341 outputs via the OU 310 to the image memory 4 image data H comprising gray-scale data which has undergone N-bit shift down and binary data obtained therefrom. In the description hereabove, it has been explained that expression (2) represents the results of the arithmetic operation of expression (1) when the first three pixels in lines 1, 2, and 3 are set to the register 303 of FIG. 5. When the next one-pixel shift is executed (under control of the control unit 312), the output Z3 is represented as follows because the register 305 of each ISP contains the pixel data: ($f_{34}$, $f_{33}$, $f_{32}$) for the ISP 341, ($f_{24}$, $f_{23}$, $f_{22}$) for the ISP 342, and ($f_{14}$, $f_{13}$, $f_{12}$) for the ISP 343

$$Z3 = \sum_{i=1}^{3} \sum_{j=1}^{3} f_{1,j+1} w_{ij} \qquad (3)$$

In general, Z3 is obtained as:

$$Z3 = \sum_{i=1}^{3} \sum_{j=1}^{3} f_{i+x, j+y} w_{ij} \qquad (4)$$

This means that the sum of products is sequentially calculated for the 3 by 3 pixels comprising the (y+1)-th, (y+2)-th, and (y+3)-th pixel data of lines x+1, x+2, and x+3. If the convolution weighting parameters $w_{ij}$ are appropriately selected, this arithmetic operation can be advantageously applicable to image processing such as noise reduction and edge emphasis. In this operation example, if the control signal OUFUN (1, N) to the OU 310 of the ISP 341 is replaced with OUFUN (2, N) (with other conditions retained), a signal resulting from an execution of an N-bit shift down conducted on the absolute value of Z3 represented by expression (4) is obtained as an output as will be seen from the contents of Table 2.

The second example is a modification of the above-stated spatial convolution in which another operation can be executed only by changing control signals. This example represents arithmetic operations for calculating the maximum and minimum values. Among the control signals of the first example, PEFUN (2), AUFUN (2), and LUFUN (2) are assumed to indicate instructions for the PE 305, AU 308, and LU 309 of each ISP. Then, each PE outputs the X input as $Z_{11}$ to $Z_{13}$ regardless of the content of the register 302 and the AU 308 outputs the maximum value thereof as $$\underset{1 \leq i \leq 3}{\mathrm{MAX}} (Z_{1i})$$

Since the LU 309 outputs the larger one of two inputs thereto, the output is thus obtained as the maximum value of the 3 by 3 pixels $f_{i+1, j+y}$ (j,j=1 to 3) explained in the first example:

$$\underset{1 \leq i,j \leq 3}{\mathrm{MAX}} (f_{i+x, j+y}) \qquad (5)$$

In this example, if LUFUN (2) and AUFUN (2) are replaced with LUFUN (3) and AUFUN (3), respectively, the minimum value as represented by $$\underset{1 \leq i,j \leq 3}{\mathrm{Min}} (f_{i+x, j+y})$$

is obtained as the output.

Figure 6:
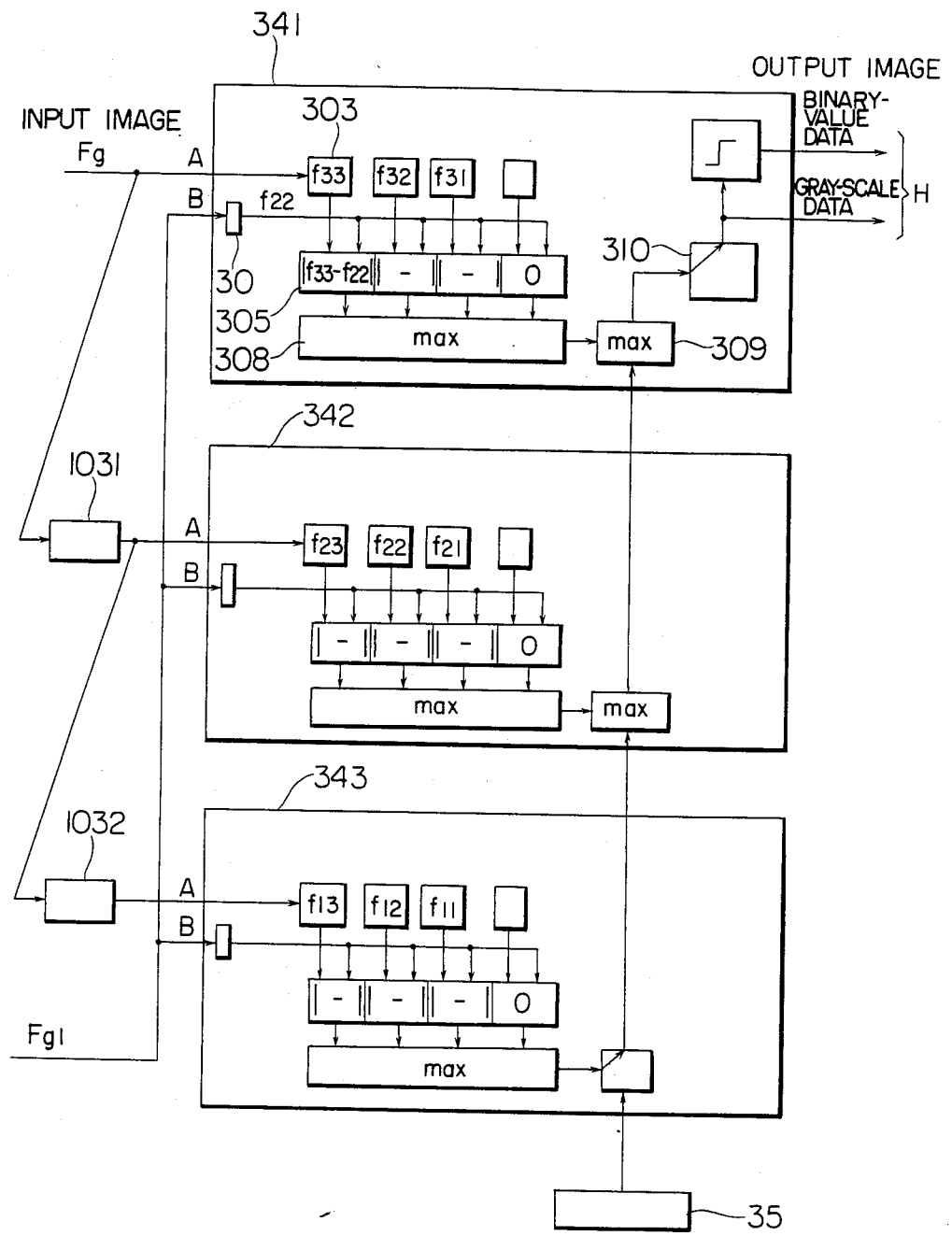
FIG. 6 illustrates a schematic block diagram for explaining an example of image processing in which a nonlinear neighborhood operation is carried out.

In the third example of FIG. 6, the nonlinear neighborhood operation is carried out for the edge emphasis. FIG. 6 illustrates the state of each unit when the program specifications are made as follows: IFUN (2), ADLY (0), BDLY (1), PEFUN (6), AUFUN (2), LUFUN (2), OUFUN (1, 0), and PEINH (1, 1, 1, 3) for each ISP, and ASEL (2) and BSEL (2). As will be clear from the similar analysis of the circuit operation to that of the example above, the maximum value is obtained as:

$$\underset{1 \leq i,j \leq 3}{\mathrm{Max}} |f_{i+x, j+y} - f_{x,y}| \qquad (6)$$

Thus, the edge emphasis function is implemented. If PEINH (3, 1, 3, 3), PEINH (1, 3, 1, 3), and PEINH (3, 1, 3, 3) are specified for the ISP's 341-343, expression (6) can be executed only at the center of the 3 by 3 pixels and in four directions thereof (upper, lower, right, and left directions).

Figure 7:
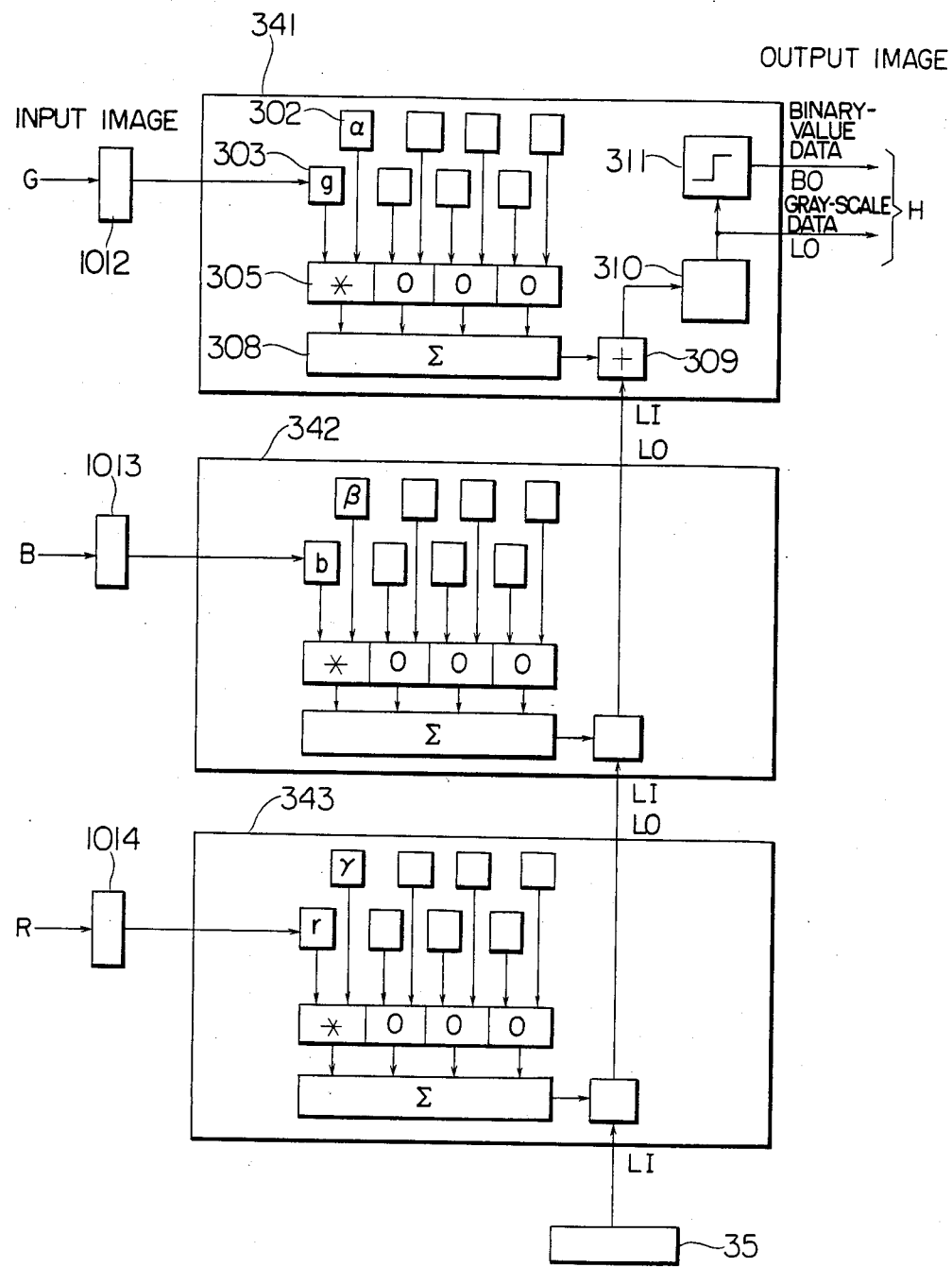
FIG. 7 is a block diagram illustrating an example of image processing in which color images are processed.

The fourth example of FIG. 7 is a color image processing in which the gray-scale data Gg, Bg, and Rg of the color image data G, B, and R are respectively used. FIG. 7 illustrates the state of each unit when ASEL (4) is specified to the selectors 1041-1043 in the image data distribute circuit 31 and the program specifications IFUN (1), ADLY (0), PEFUN (1), AUFUN (1), LUFUN (1), OUFUN (1, 0), and PEINH (1, 2, 2, 2) are made to each ISP, hence the following operation is carried out: PS $$\alpha *G + \beta *B + \gamma *R \qquad (7)$$

where; $\alpha$, $\beta$, and $\gamma$ are coefficients loaded in the RAM 302 of the ISP. This function is used to convert a color image into a monochrome image. It can be further applicable to the operations described below by changing PEFUN, AUFUN, and LUFUN.

Color image distance $$|G-\alpha| + |B-\beta| + |R-\gamma| \qquad (8)$$

Maximum and minimum values of color image $$\mathrm{Max}\ (G, B, R) \qquad (9)$$

$$\mathrm{Min}\ (G, B, R) \qquad (10)$$

Figure 8:
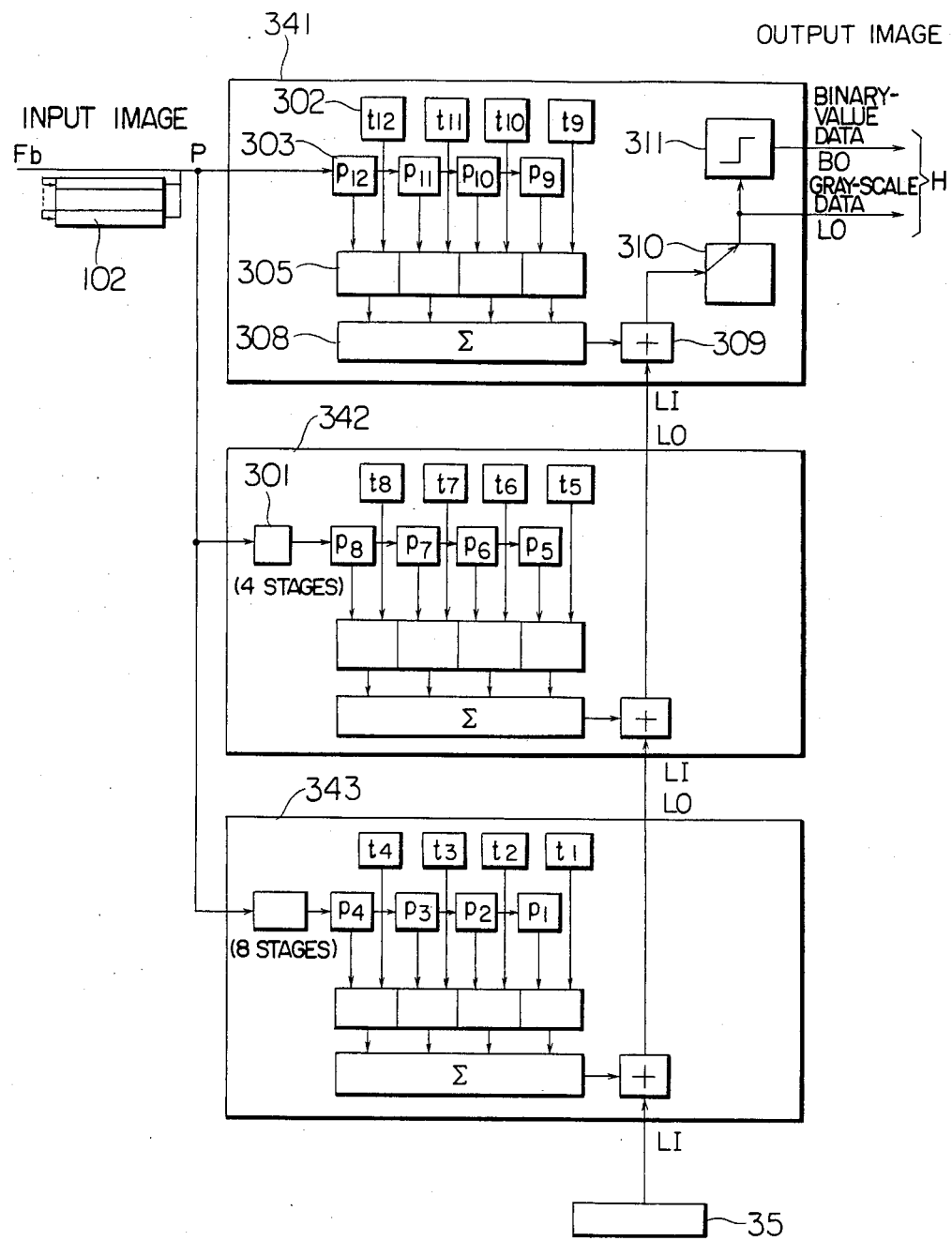
FIG. 8 is a schematic diagram demonstrating an example of image processing in which a pattern matching operation is conducted on binary images.

The fifth example of FIG. 8 represents a binary-value patter matching operation in which the binary data $F_{60}$ to $F_{67}$ of the gray-scale image data F are used. FIG. 8 depicts the state of each unit when ASEL (3) is specified for the selectors 1041-1043 of the image data distribute circuit 31, the program specifications IFUN (1), PEFUN (13), AUFUN (1), LUFUN (1), OUFUN (1, 0), and PEINH (1, 1, 1, 1) are made to each ISP, and ADLY (0), ADLY (4), and ADLY (8) are specified for the ISP's 341, 342, and 343, respectively. In this case, the following operation is achieved.

$$\sum_{i=1}^{12} \text{(count of bits matched between } P_i \text{ and } T_i\text{)} \quad (11)$$

$P_{12}$ represents a binary data of eight vertical pixels on the screen because the binary data $F_b$ is delayed by one line to seven lines in the delay circuit 102, while $P_{11}$ to $P_1$ are obtained by delaying the binary data $F_b$ by one pixel to 11 pixels. As a result, a binary image comprising 8 (vertical) by 12 (horizontal) pixels on the screen is stored as $P_{12}$ to $P_1$ in the shift register 303, hence the pattern matching between these data items and the template signals $t_{12}$ to $t_1$ stored in the RAM 302 can be implemented.

Operations of the multifunctional image processor have been described by referring to five examples; however, a variety of operations such as the gray-scale density conversion and arithmetic operation between a binary image and a gray-scale image can also be accomplished by use of the mono-chrome image data and color image data each comprising gray-scale data and binary data.

In accordance with the present invention, various kinds of data processing configurations and operation functions can be specified by use of programs, hence the present invention effectively enables a single image processor to execute many image processing functions at a higher speed.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

We claim:

1. A multifunctional image processor for inputting image data and for programmably performing various kinds of image processing in accordance with an external control signal supplied from a control processor, comprising image data distribute means and parallel image data processing means wherein;

(a) said image data distribute means for distributing image data includes:
  a plurality of input means capable of inputting binary image data, gray-scale image data and color image data, each constituting image data;
  binary image data delay means for delaying the binary image data to thereby generate a plurality of delayed binary image data successively delayed by one line of pixels;
  gray-scale image data delay means for delaying the gray-scale image data to thereby generate a plurality of delayed gray-scale image data successively delayed by one line of pixels; and
  select means connected to receive at least said delayed binary image data, said gray-scale image data, said delayed gray-scale image data and said color image data, for selecting image data to be distributed to said parallel image data processing means in accordance with said external control signal; and (b) said parallel image data processing means includes
  a plurality of image signal processor juxtaposed and connected in cascade to each other for parallel processing of image data, each of said image signal processors having means for storing weighting coefficients for use in spatial convolution and color image processing operations, a plurality of input ports connected to receive image data from said image data distribute means, shift register means connected to said input ports and having a plurality of shift stages for shifting image data received from at least one of said ports through said shift stages, a plurality of processor elements each connected to said storage means and to a respective shift stage of said shift register means for parallelly processing the image data inputted thereto to perform processing operations on said image data in accordance with said external control signal, arithmetic means connected to said plurality of processor elements for combining processed image data received therefrom to produce output image data, internal control means responsive to an external function specifying signal from said control processor for controlling the operations of said processor elements, and linkage means for combining the output image data from said arithmetic means with image data received from said control processor or another parallel image data processing means to supply combined image data to an output port; and (c) said image data distribute means is connected to said parallel image data processing means so as to distribute the image data to said image signal processors, whereby said image signal processors can selectively process in parallel one of at least spatial convolution, color image processing and binary pattern matching processing operations in accordance with said external control signal.

2. A multifunctional image processor according to claim 1 wherein said multifunctional image processor further comprises;
control signal store means connected to said image data distribute means for storing said control signal, whereby the image data is selected by inputting a control signal from said control signal store means to said select means of said image data distribute means.

3. A multifunctional image processor according to claim 1 wherein said select means of said image data distribute means selects the gray-scale image data and the delayed gray-scale image data by use of a specified control signal, and a spatial convolution is thereby carried out by distributing the selected image data to said parallel image data processing means.

4. A multifunctional image processor according to claim 1 wherein said select means of said image data distribute means selects the gray-scale image data and the delayed gray-scale image data by use of a specified control signal, and a nonlinear neighborhood arithmetic operation is thereby conducted by distributing the selected image data to said parallel image data processing means.

5. A multifunctional image processor according to claim 1 wherein said select means of said image data distribute means selects the color image data, and a color image processing is thereby carried out by distributing the selected image data to said parallel image data processing means.

6. A multifunctional image processor according to claim 1 wherein said select means of said image data distribute means selects the binary image data and the delayed binary image data, and a binary value pattern matching operation is thereby executed by distributing the selected image data to said parallel image data processing means.

* * * * *